C. W. WHITE.
PHOTOGRAPHIC PICTURE ENLARGING APPARATUS.
APPLICATION FILED AUG. 19, 1912.
1,157,742.
Patented Oct. 26, 1915.
2 SHEETS—SHEET 2.
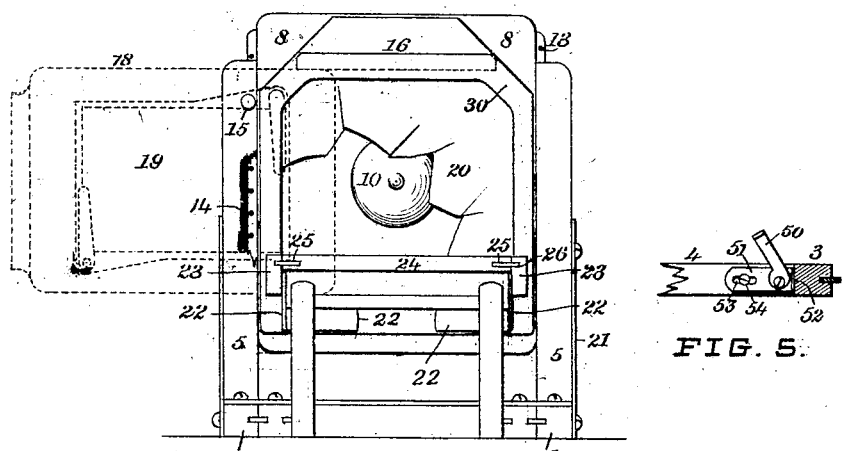
FIG. 3.
FIG. 5.
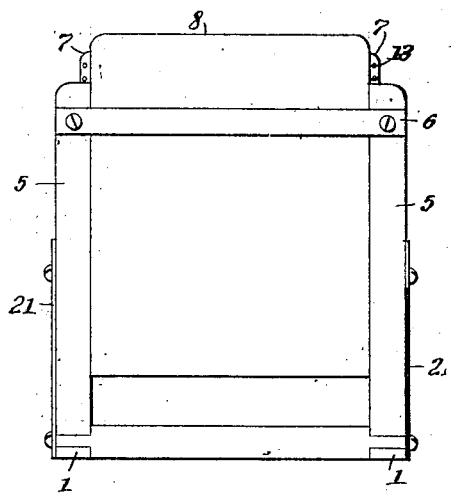
FIG. 4.
WITNESSES
J Edward White
INVENTOR.
CLARENCE W. WHITE.
BY Franklin Scott, ATTORNEY.

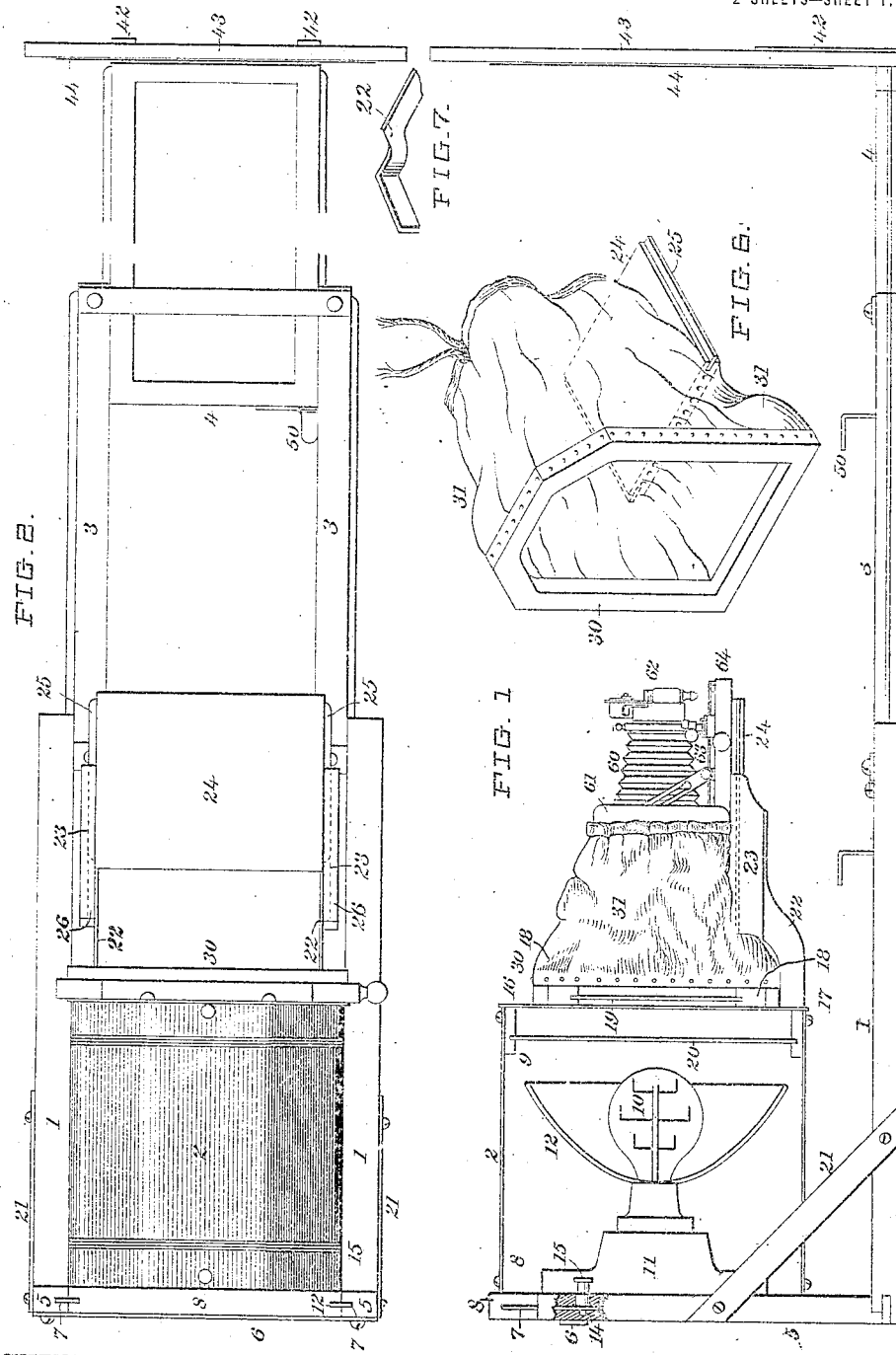

UNITED STATES PATENT OFFICE.

CLARENCE W. WHITE, OF NORTH BENNINGTON, VERMONT.

PHOTOGRAPHIC-PICTURE-ENLARGING APPARATUS.

1,157,742. Specification of Letters Patent. Patented Oct. 26, 1915.

Application filed August 19, 1912. Serial No. 715,723.

*To all whom it may concern:*

Be it known that I, CLARENCE W. WHITE, a citizen of the United States, residing at the village of North Bennington, in the county of Bennington and State of Vermont, have invented a new and useful Improvement in Photographic-Picture-Enlarging Apparatus, which improvement is fully set forth in the following specification and accompanying drawings, in which—

Figure 1 shows a side elevation of the invention, the lamp-chamber being shown in vertical longitudinal section. Fig. 2 is a horizontal top plan view of the invention. Fig. 3 is a front end elevation of the apparatus. Fig. 4 is an elevation of the rear end of the apparatus. Fig. 5 is a detail view of a binding clamp for holding the several panels of the frame in adjustment. Fig. 6 is a perspective view of the opaque hood which excludes light from the interior of the camera box. Fig. 7 is a detail perspective view of bracket 22 as detached from its connection with the apparatus.

This apparatus is intended for the use of photographers or others, and is employed in the production of pictures from small negatives or films on an enlarged scale, by projecting the image of the picture developed on the negative or film on a sensitized sheet of paper supported on a board or stretcher which is carried on an easel which constitutes a constituent part of the apparatus.

The object of the invention is to provide in a unitary organization means for supporting and adjusting a lamp chamber, a negative holder, a camera and easel for supporting the stretcher on which bromid paper, or other sensitized paper is mounted. Each enlarger is provided with an opaque hood which in use extends from the opening in front of the lamp chamber to and connects with the back of the camera.

To obtain enlargements from ordinary negatives by the use of ordinary cameras provided with magnifying lenses, provisions operating independently of the camera must be brought into requisition and so connected with the camera as to secure perfect axial alinement of the lamp or other source of light, the negative, lenses and the easel which carries the sensitized paper upon which the enlargement is to be depicted. These arrangements involve the use of separate, independent sections of the apparatus, dark rooms or chambers, separate and distinct stands or other supports for the camera and negative holder, and also a movable or adjustable easel or support for the paper for the enlarged print. All these defects and inconveniences are obviated by this invention.

The frame-work which forms the base of the apparatus consists of two or more panels telescopically connected so that the narrower may slide within the wider to facilitate focusing or packing for transportation. In this case only three such panels are shown but more or less may be employed. The head panel 1, supports the lamp chamber 2, the middle panel 3 serves mainly as a connection or link to carry the easel-supporting panel 4, and panel 4, 4, carries the easel fixture for mounting the paper for the enlarged copy.

Panel 1, has two upright posts 5, 5, which are held to their proper positions by the cross-bar 6. The inside edges of these posts are grooved as at 7 to form the female members of a slideway for the lamp chamber 2, to which a shelf 24 is attached for supporting a camera. This lamp-chamber is preferably made of thin, sheet metal which is bent around to the proper shape and is attached to the front and rear wall pieces 8 and 9. To the inside of the rear wall 8 an electric or other light 10 is attached which illuminates the negative 19 carried in the negative holder 18. In the vertical edges of the rear wall 8, of the lamp-chamber, two metal slides 12, 12, are fixed which are adapted to slide vertically in the grooves or slideways, 7, 7, of the posts 5, 5. To provide a sure locking device for holding the chamber at any desired elevation, the slides 12 are perforated as at 13, Fig. 3, and a locking spring-pin, 15 is connected with the post 5, which may engage any one of these holes when set in opposition thereto. Thus, by pulling back the spring-pin 15, the chamber 2 is left free to be moved up and down for a change of elevation. This adjustment is used in bringing the light and camera into axial vertical alinement with the center of the proposed picture 44 on the easel board 43, so that the light, the lens of the camera and the center of the proposed picture shall be in line. To the front 9 of the light chamber two brackets 22, 22, Fig. 3 project to which the slideways 23, 23, are attached. These are grooved as at 26, 26, to receive the slides 25, 25, which are attached to the sliding shelf 24. This shelf is designed to carry a camera which may be fastened thereon in any convenient way. This shelf, as is apparent, can be moved toward and from the light. As the focal length of the lenses in ordinary cameras, for example, may be stated to be approximately 7 inches and the variation therefrom in taking pictures under ordinary conditions will not exceed half an inch, in making enlargements it becomes necessary where the bromid paper may not be more than two feet from the lens, to have means for accommodating the focal length of the lens to such limited distance, as the ordinary bellows is not capable of such accommodation. Hence, by fastening an ordinary camera provided with means for adjusting the magnifying lens of the camera vertically and longitudinally to the shelf 24, the range of horizontal adjustment afforded by the ordinary camera bellows becomes augmented by the distance which the shelf may be slid toward and from the lamp chamber, and this augmented distance permits the easel to be brought up very close to the camera, so that the desired enlargement of the negative can be obtained in a very short distance. The hood 31 which connects the camera bellows with the lamp chamber operates as a practical extension of the bellows rearwardly and contributes materially to successful operation of the apparatus in practice.

To exclude all external light from the interior of the camera box and bellows, a hood 31, of special construction is provided. This consists of a frame 30, which may be secured to the front of the lamp chamber as seen in Fig. 1, and a hood 31 of black cloth or any other suitable material which will render any inclosure made of it opaque, is attached to it. The rear margin of this hood is securely fastened to the outer margin of frame 30 and the lower part of its front, open end is secured to the rear edge of shelf 24. The front edge of this hood is hemmed so that a gathering cord can be run in by which the open end can be drawn up around the camera box, its upper front end being left slightly open for the purpose of wrapping it around the camera. This device is shown detached in perspective in Fig. 6.

The middle part of the frame 3, serves simply as a connection between the end panels and affords means for obtaining greater extension of the base, hence, no detail description of it is necessary beyond remarking that its connection with the other members is a sliding one like that between the shelf 24 and the grooved ways in which it works.

The front end panel 4, is provided with two upright supports 42, 42, against which a board or an easel 44, can rest. By sliding the panel 4 in or out the focal range of the camera lens may approximately be determined.

Within the lamp chamber a pane of ground glass, 20, is placed between the lamp 10 and the negative 19, for the purpose of effecting a better diffusion of the light as it passes through the negative.

Any kind of a camera, such as are now in common use, for taking small pictures, like the "kodak", for instance, may be utilized with this enlarging apparatus.

This apparatus can be used as follows: The bromid or other paper upon which the enlargement is to be made, is attached to a plane board or other suitable stretcher which is then put in place on the easel section of the frame as at 43, care being taken to get the center of the paper in line with the horizontal axis of the instrument. The lamp being in proper condition for service, the negative frame with the negative in position, is then slid into position before the lamp. The shelf 24, is then slid into position and the hood-frame 30, secured to the lamp-chamber. The camera having then been attached to the camera shelf, the free end of the hood is brought forward and wrapped around the camera box and its gathering cord 55 drawn up tightly so as to effect complete seclusion of the lamp-light within the interior of the hood and bellows, and complete exclusion of external light from the interior thereof. The several members being thus assembled, the telescopic sections of the base are extended or drawn out far enough to put the paper approximately in a correct focal position, when the locks 50, are turned down, thus binding the several panels together inseparably. The correct position for the camera may be found by sliding the camera shelf in or out to determine the correct focal position while its adjustment for throwing the image in the center of the bromid paper laterally considered, can be effected by the means with which all cameras are fitted to move the lens end of the bellows horizontally. Modifications of the vertical adjustment of the lens may be secured by the means usually provided for that purpose on all cameras.

For purposes of storage or transportation it is apparent that this sectional base frame may be shortened by closing up the telescopic sections, forcing down the lamp-chamber, forcing back the camera shelf and detaching the hood frame from the lamp chamber and laying it down on the shelf which will bring the compass of the whole apparatus within little more than a cubic foot.

I therefore claim as my invention and desire to protect by Letters Patent, the following:

1. In a picture enlarging apparatus of the character described, the combination of a base consisting of sections extensibly connected, of which the terminal members carry at one end a source of illumination, and at the other end a support for the copy to be produced, and between said terminals a longitudinally adjustable support for camera, substantially as specified.

2. The combination in a picture enlarging apparatus, of an extensible base, a vertically adjustable chamber and a source of illumination arranged therein, a longitudinally adjustable camera support attached to and vertically adjustable with said chamber, and means for supporting the paper or other material for the enlarged copy of the negative undergoing enlargement, mounted on said base, substantially as specified.

3. The combination in a picture enlarging apparatus, of a base, a lamp chamber mounted thereon and means connected therewith for vertically adjusting the height of the same in relation to the base, a camera support connected with said chamber and movable therewith, means for horizontally adjusting its position in the direction of the long axis of said base, an opaque hood for inclosing the space and excluding external light therefrom between the front of said lamp chamber and the camera and retaining all light generated within said interval, and means for supporting the picture enlargement during its production, substantially as specified.

4. The combination in a picture enlarging apparatus, of a base, a lamp chamber mounted thereon and means connected therewith for vertically adjusting the height of the same, a source of light within said chamber, a seat for a negative frame, a magnifying lens, and means for adjusting the same vertically, and means for excluding external light from the space between said chamber and said lens, and means for supporting the picture enlargement, substantially as specified.

5. In a picture enlarging apparatus of the character described, a base consisting of sections extensibly connected, of which the terminal members carry at one end a source of illumination and an attached camera, and at the other end a support for the copy to be produced, and means for vertically adjusting the light and camera, substantially as specified.

6. The combination in a picture enlarging apparatus of the character described, of a base, a lamp chamber containing a source of light and a camera connected with said chamber, means for effecting vertical adjustment of said chamber and camera upon said base, and means for supporting an easel or other support for an enlarged picture attached thereto, substantially as specified.

7. The combination in a picture enlarging apparatus, of a base upon which are mounted at opposite ends a lamp-chamber and a picture supporting easel and between them a camera support connected with said lamp chamber, means for vertically adjusting said chamber and camera support and for longitudinally adjusting the position of the camera between the light and the said easel, substantially as specified.

8. In combination with the lamp chamber and the camera shelf of an opaque collapsible hood, as a supplemental provision for extending the camera bellows for the purposes specified.

9. In a picture enlarging apparatus, the combination with a supporting base, of a lamp chamber and provisions connected therewith for the attachment of a camera, of means for adjusting the height of said chamber and camera attachment, substantially as specified.

10. The combination with the lamp chamber and camera support, of an opaque, collapsible hood attached to one of said members and adapted to be connected with the other of said members by means which secure a photo-tight inclosure between the lamp and the lens of any camera which may be carried by said camera support as a supplemental provision for extending the camera bellows, substantially as specified.

11. The combination in a picture enlarging apparatus, of a lamp chamber mounted thereon and means connected therewith for vertically adjusting the height of the same in relation to the base, a camera support connected with said chamber and movable therewith, and means for horizontally adjusting its position in the direction of the long axis of said base, substantially as specified.

12. In a picture enlarging apparatus, of the character described, the combination of a base consisting of sections extensibly connected, locking devices for holding said sections in adjustment, of which base the terminal members carry at one end a source of illumination, and at the other end a support for the copy to be produced, and between said terminals and attached to one of them a longitudinally adjustable support for a camera, substantially as specified.

In witness whereof I have hereunto subscribed my name at North Bennington, Vt., this 16th day of August, 1912, in the presence of two witnesses.

CLARENCE W. WHITE.

Witnesses:
  EMILY SCOTT,
  FRANKLIN SCOTT.